United States Patent
Kim et al.

(10) Patent No.: US 9,194,536 B2
(45) Date of Patent: Nov. 24, 2015

(54) PORTABLE FOLDABLE CRADLE

(71) Applicant: Samsung Electronics Co., Ltd., Gyeonggi-do (KR)

(72) Inventors: Dalwon Kim, Gyeonggi-do (KR); Ilkwon Kim, Gyeonggi-do (KR); Seungtae Ryu, Seoul (KR); Yonghoon Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/446,775

(22) Filed: Jul. 30, 2014

(65) Prior Publication Data

US 2015/0034781 A1    Feb. 5, 2015

(30) Foreign Application Priority Data

Jul. 31, 2013 (KR) .................. 10-2013-0090718

(51) Int. Cl.
*F16M 11/00* (2006.01)
*F16M 11/38* (2006.01)
*F16M 13/00* (2006.01)
*G06F 1/16* (2006.01)

(52) U.S. Cl.
CPC ............ *F16M 11/38* (2013.01); *F16M 13/00* (2013.01); *G06F 1/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,169,869 A * | 2/1916 | Richards | .................. | 248/453 |
| 1,812,318 A * | 6/1931 | Bower | .................. | 211/37 |
| 2,008,093 A * | 7/1935 | Carwardine | .................. | 248/472 |
| 2,591,170 A * | 4/1952 | Levinson et al. | .................. | 248/456 |
| 3,460,795 A * | 8/1969 | Dahlin | .................. | 248/452 |
| 5,083,663 A * | 1/1992 | Conway et al. | .................. | 206/45.26 |
| 5,607,135 A * | 3/1997 | Yamada | .................. | 248/456 |
| 5,927,673 A * | 7/1999 | Kurokawa et al. | .................. | 248/456 |
| 6,098,952 A * | 8/2000 | Tonn | .................. | 248/688 |
| 6,196,512 B1 * | 3/2001 | Ure | .................. | 248/464 |
| 6,418,010 B1 * | 7/2002 | Sawyer | .................. | 361/679.05 |
| 7,758,009 B1 * | 7/2010 | Chang | .................. | 248/460 |
| D639,816 S | 6/2011 | Bau | | |
| 7,986,368 B2 * | 7/2011 | Lin et al. | .................. | 348/373 |
| 8,016,107 B2 * | 9/2011 | Emsky | .................. | 206/320 |
| 8,143,982 B1 | 3/2012 | Lauder et al. | | |
| 8,162,283 B1 * | 4/2012 | Royz et al. | .................. | 248/455 |
| 8,333,353 B1 * | 12/2012 | Silverman et al. | .................. | 248/205.6 |
| 8,382,059 B2 * | 2/2013 | Le Gette et al. | .................. | 248/460 |
| 8,540,202 B2 * | 9/2013 | Hu et al. | .................. | 248/371 |
| 8,659,887 B2 * | 2/2014 | Lee | .................. | 361/679.3 |

(Continued)

FOREIGN PATENT DOCUMENTS

EP  2378743 A1  10/2011
KR  10-0770858 B1  10/2007

(Continued)

*Primary Examiner* — Monica Millner
(74) *Attorney, Agent, or Firm* — Cha & Reiter, LLC

(57) ABSTRACT

Disclosed herein is a portable foldable cradle. A rear plate is rotatably coupled to the front plate to enable the rear plate to be unfolded from the front plate. A support mechanism is in between the front plate and the rear plate in which a first end of the support mechanism is hinged to a cradling unit configured to support an electronic device thereon. The cradling unit protrudes from one side of the front plate, when the front plate and the rear plate are rotated to an oblique angle.

14 Claims, 11 Drawing Sheets

(56) References Cited

U.S. PATENT DOCUMENTS

| | | | |
|---|---|---|---|
| 8,857,773 B2* | 10/2014 | Krohn et al. | 248/122.1 |
| 2005/0098510 A1* | 5/2005 | Lom et al. | 211/13.1 |
| 2005/0205745 A1* | 9/2005 | Lee | 248/371 |
| 2006/0175522 A1* | 8/2006 | Axel | 248/454 |
| 2008/0061205 A1 | 3/2008 | Park et al. | |
| 2008/0078109 A1* | 4/2008 | Terleski et al. | 40/316 |
| 2008/0230672 A1* | 9/2008 | Pachowski | 248/453 |
| 2008/0251659 A1* | 10/2008 | Matias | 248/166 |
| 2010/0090085 A1* | 4/2010 | Corrion | 248/459 |
| 2010/0171671 A1* | 7/2010 | Park | 343/720 |
| 2010/0213331 A1* | 8/2010 | Liou | 248/176.3 |
| 2010/0315768 A1* | 12/2010 | Green | 361/679.21 |
| 2011/0253850 A1 | 10/2011 | Bau | |
| 2012/0001045 A1* | 1/2012 | Wang | 248/281.11 |
| 2012/0006950 A1* | 1/2012 | Vandiver | 248/176.3 |
| 2012/0037047 A1* | 2/2012 | Moldovan | 108/3 |
| 2012/0074271 A1 | 3/2012 | Goetz | |
| 2012/0125791 A1* | 5/2012 | Parker et al. | 206/45.2 |
| 2012/0145835 A1* | 6/2012 | Zaharakis et al. | 248/65 |
| 2012/0170194 A1* | 7/2012 | Lord et al. | 361/679.02 |
| 2012/0326003 A1* | 12/2012 | Solow et al. | 248/688 |
| 2013/0240704 A1* | 9/2013 | Andrews | 248/454 |
| 2014/0116299 A1* | 5/2014 | Salehi et al. | 108/32 |

FOREIGN PATENT DOCUMENTS

| | | |
|---|---|---|
| KR | 10-2010-0031424 A | 3/2010 |
| KR | 20-0458168 Y1 | 1/2012 |
| WO | 2010/004329 A1 | 1/2010 |

* cited by examiner

COUPLE TERMINAL CRADLING UNIT AND SUPPORT 1 BY INSERTING PIN 1

COUPLE ELEMENTS COUPLED IN FIGS. 6 AND 7 TO INNER PLATE

PORTABLE FOLDABLE CRADLE

CROSS-REFERENCE TO RELATED APPLICATION

This application claims priority from and the benefit under 35 U.S.C. §119(a) of Korean Patent Application No. 10-2013-0090718, filed on Jul. 31, 2013, which is hereby incorporated by reference herein.

BACKGROUND

1. Technical Field

The present disclosure relates to a portable foldable cradle, and more particularly, to a portable foldable cradle that allows an electronic device to be charged while being supporting in the cradle and provides easy and convenient portability.

2. Description of Related Art

Portable electronic devices operated with a touch screen, such as smart phones or tablet PCs, have become popular around the world. Although, in a work environment, these portable devices are not as convenient as netbook PCs or notebook PCs, demand for these electronic devices has increased among students and office workers due to their portability and convenience.

Tablet PCs sold in the market today include, but are not limited to, Galaxy Tab®manufactured by Samsung Electronic, iPad manufactured by Apple Inc., Identity tab manufactured by Identity, BlackBerry Playbook manufactured by RIM, Slate manufactured by Hewlett-Packard, Folio 100 manufactured Toshiba, Eeepad manufactured by Asus, iStation Z3D, Optimus Pad manufactured by LG Electronics, etc.

As more and more functions converge on such devices, the time users spend using these devices for functions such as DMB broadcasting, video image playback, image show, camera photographing, etc. increases. The use of other functions such as inputting characters through a virtual keyboard displayed on a touch screen, drawing pictures using a stylus touch pen, or reading electronic books is also increasing.

Recent trends indicate that the weight of electronic devices with larger displays may be inconvenient for users as they hold such devices for a long time. Accordingly, support accessories have been developed that can support the weight of these devices for users.

U.S. Pat. No. 8,143,982 (entitled "Foldable Accessory Device) discloses a foldable accessory device which may be releasably attached to a tablet PC using a magnetic element incorporated therein and folded such that the tablet PC and the accessory device overlap.

However, conventional foldable accessory devices may adversely affect a user's ability to operate the tablet PC, since the accessory device is releasably attached to the tablet PC using a magnetic element.

In addition, a separate connection device may be required to couple the foldable accessory device to the electronic device. However, since this separate connection protrudes from the electronic device, the overall appearance of the device is not as pleasing. Furthermore, the separate connection increases the weight of the portable electronic device.

Accordingly, there is a need for an electronic device cradle that is more convenient and easier to carry without adversely affecting the use of the electronic device, when it's placed on the cradle.

SUMMARY

In view of the foregoing, examples disclosed herein illustrate a portable foldable cradle that does not interfere with the operation and performance of the electronic device, when the device is on the cradle. Furthermore, examples disclosed herein illustrate a portable foldable cradle that is easy to assemble and more convenient for the user to operate and carry. In addition, examples disclosed herein illustrate a foldable cradle that is easy and economical to manufacture.

In one example, the portable foldable cradle may comprise: a front plate; a rear plate rotatably coupled to and folded on the front plate; and a support mechanism between the front plate and the rear plate in which a first end of the support mechanism is hinged to a cradling unit to support an electronic device thereon, the cradling unit to protrude from one side of the front plate, when the front plate and the rear plate are unfolded to an oblique angle.

In another example, the cradling unit may be formed in a "C" shape such that a central portion of the cradling unit comprises an opening. Such opening may allow a cable to be coupled to the electronic device through the opening, when the electronic device is situated on the cradling unit.

Thus, the portable foldable cradle disclosed herein may eliminate the need for a magnetic element to cradle an electronic device such that the operation and performance of the electronic device is not affected, which improves the reliability of the electronic device. The portable foldable cradle may be configured such that the number of steps needed to fold and unfold the cradle is kept to a minimum. In another aspect, the thickness of the portable foldable cradle, when folded, may be kept to a minimum to make it easier to carry.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
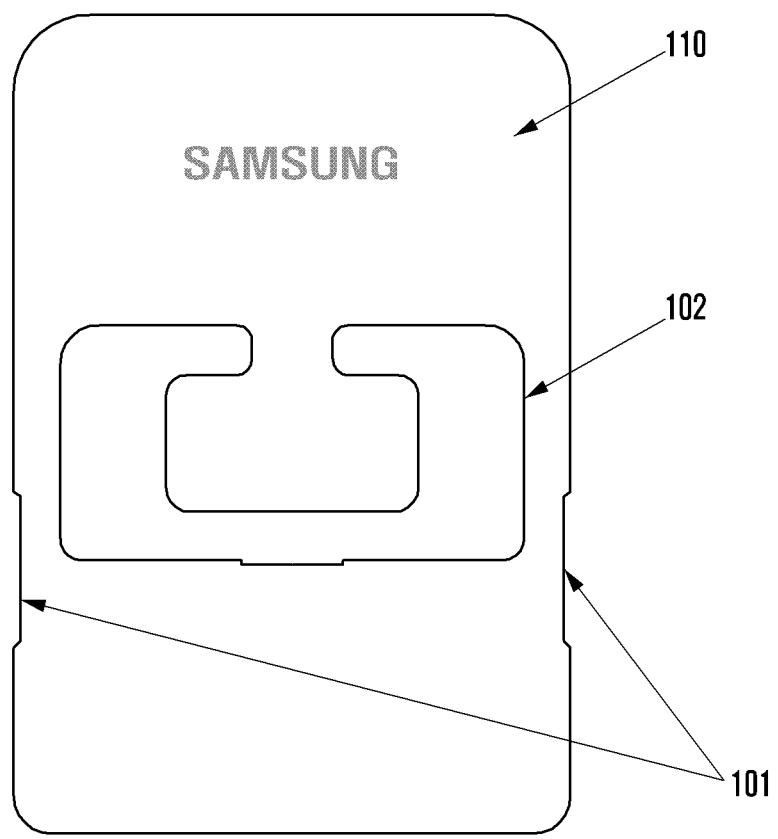
FIG. 1 is a front view illustrating an example portable foldable cradle in accordance with aspects of the present disclosure.

Hereinafter, examples of the present disclosure will be described in detail with reference to the accompanying drawings. At this time, the same components in the accompanying drawings will be designated by the same reference numerals as far as possible. Further, a detailed description of known functions and configurations incorporated herein will be omitted when it may make the subject matter of the present disclosure rather unclear.

In one example, a portable foldable cradle for cradling an electronic device may be configured such that the electronic device can be charged through a cable connection even when the electronic device is supported on the foldable cradle.

The examples disclosed herein allow a portable foldable cradle to have a minimal thickness and volume so as to enhance easy and convenient portability. In addition, the number of steps of folding and unfolding the foldable cradle may be minimized to make it easier to use.

Figure 2:
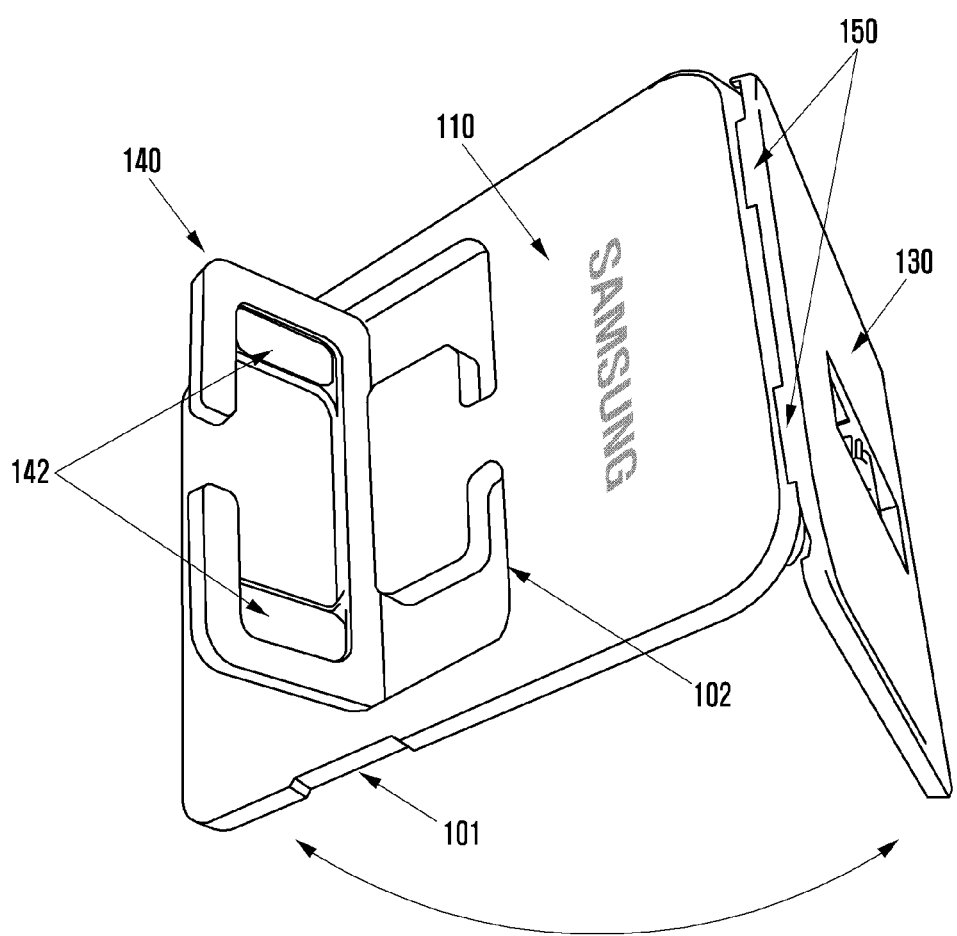
FIG. 2 is a top side perspective view of an example portable foldable cradle in accordance with aspects of the present disclosure.

Referring now to FIGS. 1 and 2, a portable foldable cradle in accordance with aspects of the present disclosure includes a front plate 110 and a rear plate 130 of which the corresponding lateral sides are coupled to each other by a hinge portion 150. The outer surface of front plate 110 may be substantially flat such that an electronic device may be supported by the outer surface of front plate 110.

Front plate 110 and rear plate 130 may be rotatably coupled to each other by the hinge portion 150 to be folded or unfolded. The hinge portion 150 may situated at an axis where front plate 110 and rear plate 130 face one another. Referring now to the example in FIG. 3, front plate 110 and rear plate 130 may be coupled to each other to be rotatable within a predetermined angle by a support mechanism 160. In this example, front plate 110 and rear plate 130 may be designed to form an angle of less than 180 degrees therebetween when they are unfolded. Rear plate 130 may be rotated from front plate 110 to a predetermined angle to support front plate 110 at an oblique angle.

Referring back to FIG. 1, lateral sides of front plate 110 may be formed with gripping recesses 101. In another example, rear plate 130 may also be formed with gripping recesses 101 (not shown). The gripping recesses 101 may be a recess dented to a predetermined depth from an edge of a face plate. A user may insert, for example, a nail or an instrument into the recess so as to unfold front plate 110 and rear plate 130 to a predetermined angle.

Figure 3:
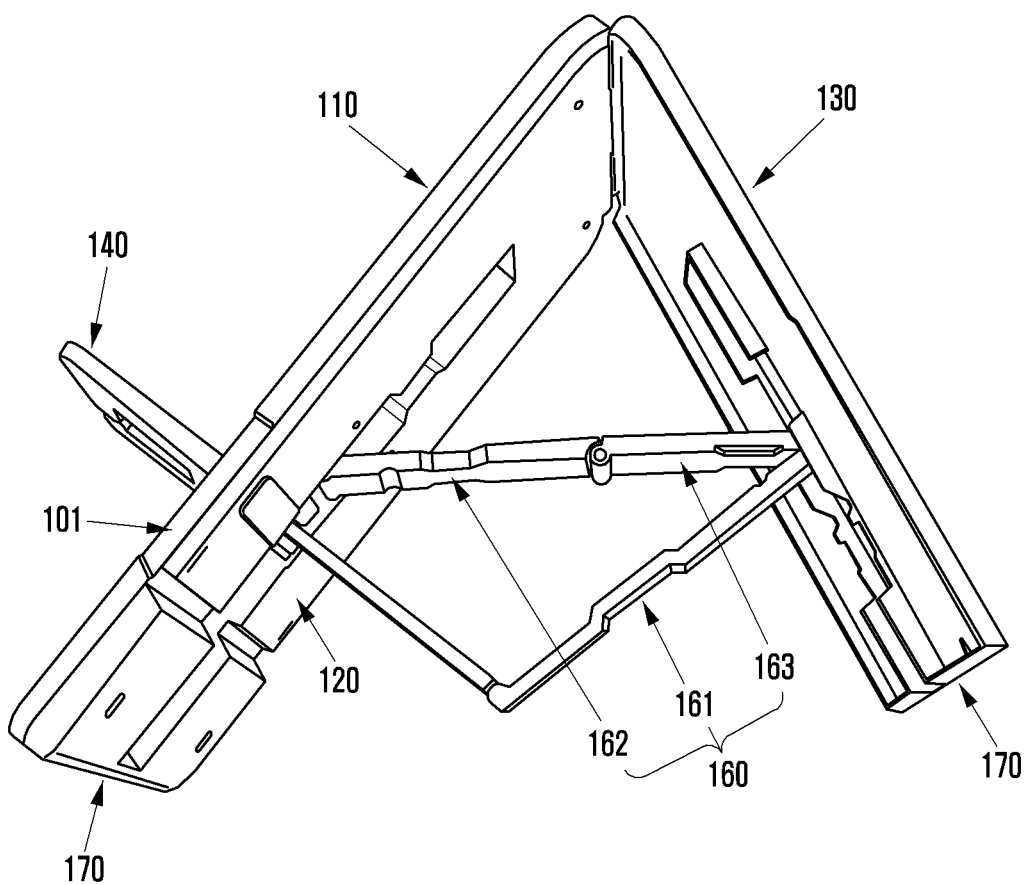
FIG. 3 is a side perspective view of an example portable foldable cradle in accordance with aspects of the present disclosure.

Referring back to the example in FIG. 3, a terminal cradling unit 140 may be hinged to one end of the support mechanism 160. Terminal cradling unit 140 extends from one end of support mechanism 160 through a portion of front plate 110 so as to protrude from front plate 110. That is, terminal cradling unit 140 may be exposed by protruding from front plate 110.

When front plate 110 and rear plate 130 are folded or unfolded, terminal cradling unit 140 may be opened or closed in relation to front plate 110. That is, terminal cradling unit 140 may be in close contact with front plate 110 in a state where the portable foldable cradle is folded as illustrated in FIG. 1.

In a state where the portable foldable cradle is unfolded as illustrated in FIGS. 2 and 3, terminal cradling unit 140 maybe spaced apart from front plate 110 by a predetermined angle and may protrude from one side of front plate 110 to allow an electronic device may be cradled thereon.

Terminal cradling unit 140 may further include an anti-slip portion 142 so as to prevent the electronic device from sliding from terminal cradling unit 140. The anti-slip portion 142 may produce friction on a surface contacted with the electronic device so as to prevent the electronic device from sliding. For this purpose, the outer surface of the anti-slip portion 142 may be formed to have an uneven configuration. Alternatively, the surface of the anti-slip portion 142 may be formed of a rough material or an elastic material (e.g., rubber or silicon).

In preparation for a case in which a connector-mounted surface of the electronic device comes in contact with a cable or connector when it is placed on terminal cradling unit 140, terminal cradling unit 140 may be formed in a "C" shape such that the central portion of terminal cradling unit 140 comprises an opening.

Figure 4:
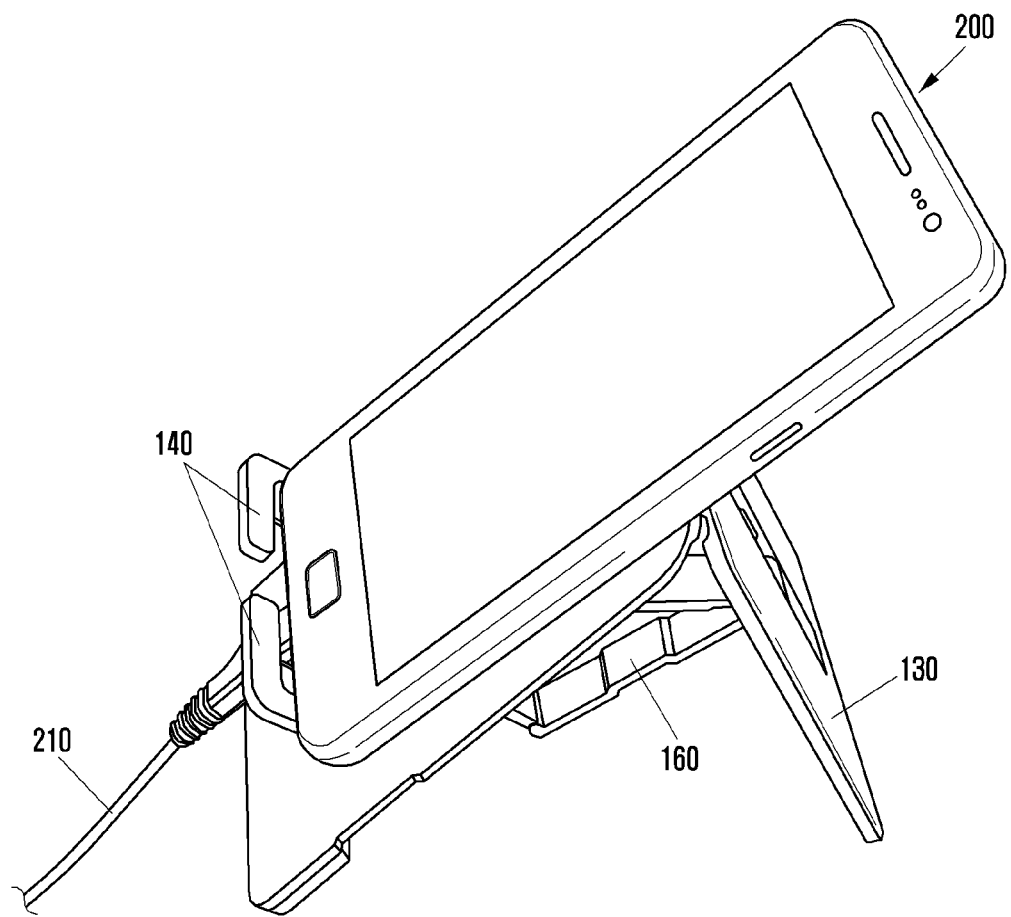
FIG. 4 is a perspective view of an electronic device cradled on an example portable foldable in accordance with aspects of the present disclosure.

This configuration allows arrangement of a space in which a cable or connector may pass through the opening to allow a cable to be connected to the electronic device, even while the bottom of the electronic device is in contact with terminal cradling unit 140. In one example, the portable foldable cradle may allow an accessory such as a charge cable to be freely attached to or detached from the electronic device while the electronic device is cradled on the portable foldable cradle as illustrated in FIG. 4.

Referring back to FIG. 1, on the outer surface of front plate 110, a recess 102 corresponding to terminal cradling unit 140 may be formed. That is, recess 102 may be formed on the outer surface of front plate 110 to correspond to terminal cradling unit 140 in size and shape. Therefore, in one example, when portable foldable cradle is folded as shown in FIG. 1, terminal cradling unit 140 may be fitted in the recess without protruding from the outer surface of front plate 110. The depth of the recess may be equal to or larger than the thickness of terminal cradling unit 140.

Referring back to FIG. 3, support mechanism 160 may be configured such that support mechanism 160 may be connected to terminal cradling unit 140 at one side and, when the portable foldable cradle is folded or unfolded, the support mechanism 160 may be folded or unfolded with the axis between front plate 110 and rear plate 130.

Support mechanism 160 may have a construction in which three separate supports 161, 162 and 163 are coupled to each other in a hinged configuration. For example, the support mechanism 160 may be configured such that the first support 161, the second support 162, and the third support 163, which are separated from each other, are rotatably coupled.

One end of first support 161 may be rotatably coupled to terminal cradling unit 140 and the other end of first support 161 may be coupled to rear plate 130. One end of second support 162 may be coupled to front plate 110, and the other end may be rotatably coupled to third support 163. The third support 163 may be coupled to rear plate 130 at the end opposite to the end where third support 163 is coupled with second support 162.

When portable foldable cradle 100 is folded as illustrated in FIG. 1, the portion where second support 162 and third support 163 are coupled to each other is folded such that second support 162, third support 163, front plate 110, and rear plate 130 come in close contact with each other.

When portable foldable cradle 100 is folded as illustrated in FIG. 1, the hinge portion where second support 162 and third support 163 are coupled to each other is folded while being moved up toward hinge portion 150, which is where front plate 110 and rear plate 130 are coupled to each other. At this time, the hinge portion where the first support 161 and terminal cradling unit 140 are coupled to each other may also be folded such that terminal cradling unit 140 may come in close contact with the outer surface of front plate 110 and first support 161 may come in close contact with the inner surface of rear plate 130.

On the inner surfaces of front plate 110 and rear plate 130 where second support 162 and third support 163 come in close contact, respectively, recesses may be formed such that the recesses are configured to receive second support 162 and third support 163, when the foldable cradle is folded.

That is, on the inner surfaces of front plate 110 and rear plate 130, recesses may be formed to correspond to second support 162 and third support 163 in shape and size, respectively. The depths of the recesses may be equal to or larger than the thickness of the second support 162 and the third support 163 to receive the second support 162 and the third support 163 respectively.

In addition, on the inner surface of rear plate 130, a recess may be formed to correspond to the first support 161 in shape and size such that the first support 161 may be received in the recess. The depth of the recess may be equal to or larger than the thickness of the first support 161 such that the first support 161 does not protrude from the recess. Using these recesses, the thickness of the cradle may be minimized so as to provide and easy and convenient portability.

When portable foldable cradle 100 is unfolded as illustrated in FIG. 3, the portion where the second support 162 and the third support 163 are coupled to each other is unfolded. In addition, the first support 161 and terminal cradling unit 140 are spaced apart from each other by a predetermined angle in substantially a "V" shape between front plate 110 and rear plate 130. As a result, terminal cradling unit 140 protruding through front plate 110 is opened to form a predetermined angle with respect to the plane of front plate 110. This allows an electronic device to be placed on terminal cradling unit 140.

An anti-slip portion 170 may be further provided on a surface of front plate 110 and rear plate 130 that comes in contact with a surface, when portable foldable cradle 100 is supported on the floor in the state where the portable foldable cradle is unfolded as illustrated in FIG. 3. The anti-slip portion 170 may be made of a material such as rubber or silicon. Thus, portable foldable cradle 100 may stably cradle the electronic device since it is provided with the anti-slip portions on the surfaces that come in contact with a surface.

Thus, portable foldable cradle 100 may be assembled so as to allow the electronic device to be placed on the cradle by unfolding front plate 110 and rear plate 130 from each other. Similarly, the portable foldable cradle may be assembled so as to allow the cradle to be carried by folding front plate 110 and rear plate 130.

Figure 5:
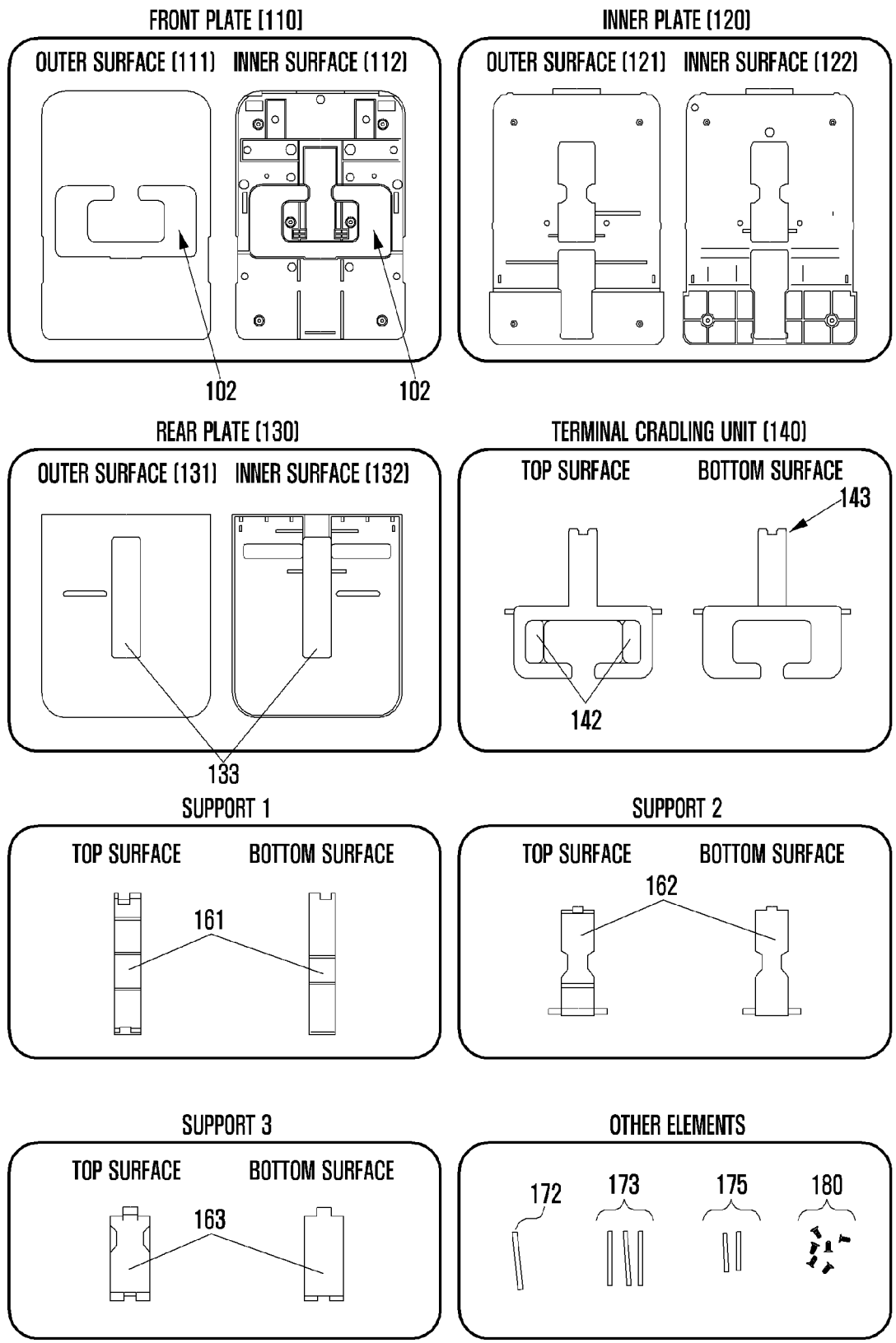
FIG. 5 is an exploded view illustrating example elements of an example in accordance with aspects of the present disclosure.

FIG. 5 illustrates exploded views of different example elements of the portable foldable cradle. The portable foldable cradle may include a front plate 110, an inner plate 120, a rear plate 130, a terminal cradling unit 140, a first support 161, a second support 162, a third support 163, and other elements.

Front plate 110 may include an outer surface 111 and an inner surface 112 which are separated from each other and may be provided in an assembled form using screws, a hinge, or an adhesive. Each of the outer surface 111 and inner surface 112 may be formed with a recess 102 which corresponds to terminal cradling unit 140 in size and shape.

The inner plate 120 may be provided as a plate inside front plate 110. The inner plate 120 may be coupled to the inner surface of front plate 110. The inner plate 120 includes an outer surface 121 and an inner surface 122 which are separated from each other and may be provided in an assembled form using screws, a hinge, or an adhesive. Each of the inner surface 122 and the outer surface 121 may be formed with holes in which the second support 162 and the support 143 extending from the bottom side of terminal cradling unit 140 are received, respectively.

Rear plate 130 includes an outer surface 131 and an inner surface 132 which are separated from each other and may be provided in an assembled form using screws, a hinge, or an adhesive. Each of an outer surface 131 and an inner surface 132 may be formed with a hole 133 in which the first support 161 and the third support 163 are received.

Terminal cradling unit 140 may include a portion which comes in contact with the electronic device when the electronic device is placed thereon and a support 143 extending from the portion which comes in contact with the electronic device. The portion which comes in contact with the electronic device electronic device may be formed in a "C" shape and further include an anti-slip portion 142 inside the "C" shape.

The first support 161, the second support 162, and the third support 163 may be formed in separated forms and rotatably coupled to each other with a hinge configuration that allows each support to be folded or unfolded in accordance with the folding and unfolding of the portable foldable cradle.

Other elements may include a rear plate pin insertion hole stopper 172, first and second pins 173 and 175 which have different lengths, and screws 180.

Figure 6:
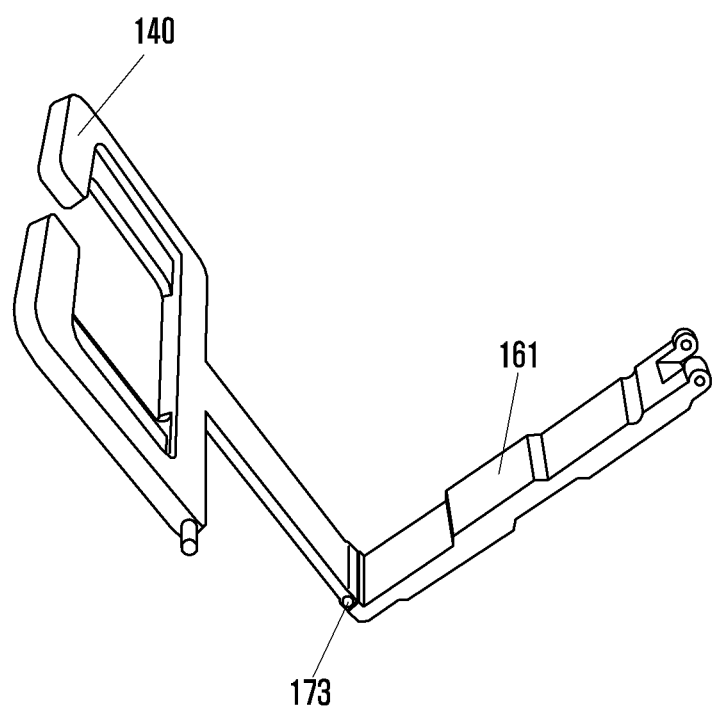
FIG. 6, FIG. 7, FIG. 8, FIG. 9, FIG. 10 and FIG. 11 are assembly views illustrating an example assembly of an example portable foldable cradle in accordance with aspects of the present disclosure.

Referring now to FIG. 6, an assembly example is shown. A first pin 173 may be inserted into one end of terminal cradling unit 140 and one end of the first support 161 so as to couple the ends with a hinge configuration. This coupling may allow terminal cradling unit 140 and first support 161 to be rotatably coupled to each other.

Figure 7:
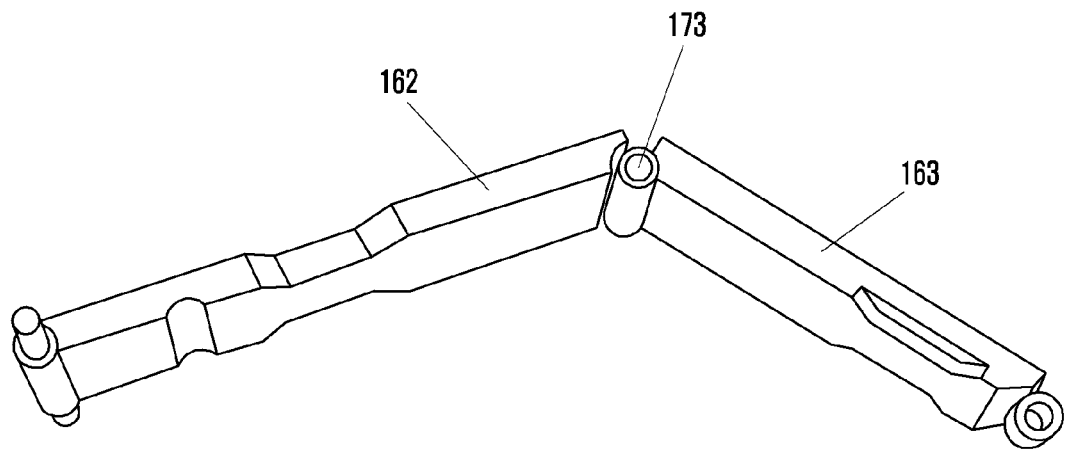

Referring to the assembly example in FIG. 7, one first pin 173 is inserted into one end of the second support 162 and one end of the third support 163 so as to couple the ends in a hinge configuration. This coupling allows second support 162 and third support 163 to be rotatably coupled to each other.

Figure 8:
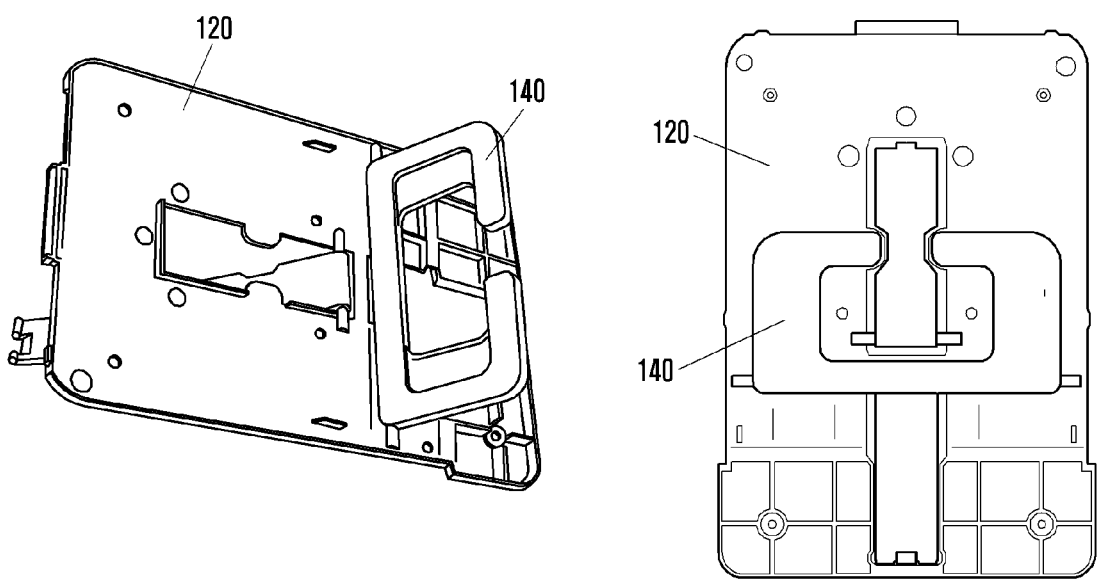

Referring to the assembly example of FIG. 8, terminal cradling unit 140 and first support 161, which may be coupled to each other as illustrated in FIGS. 6-7, may be coupled to inner plate 120. Second support 162 and third support 163 may be coupled to inner plate 120.

Figure 9:
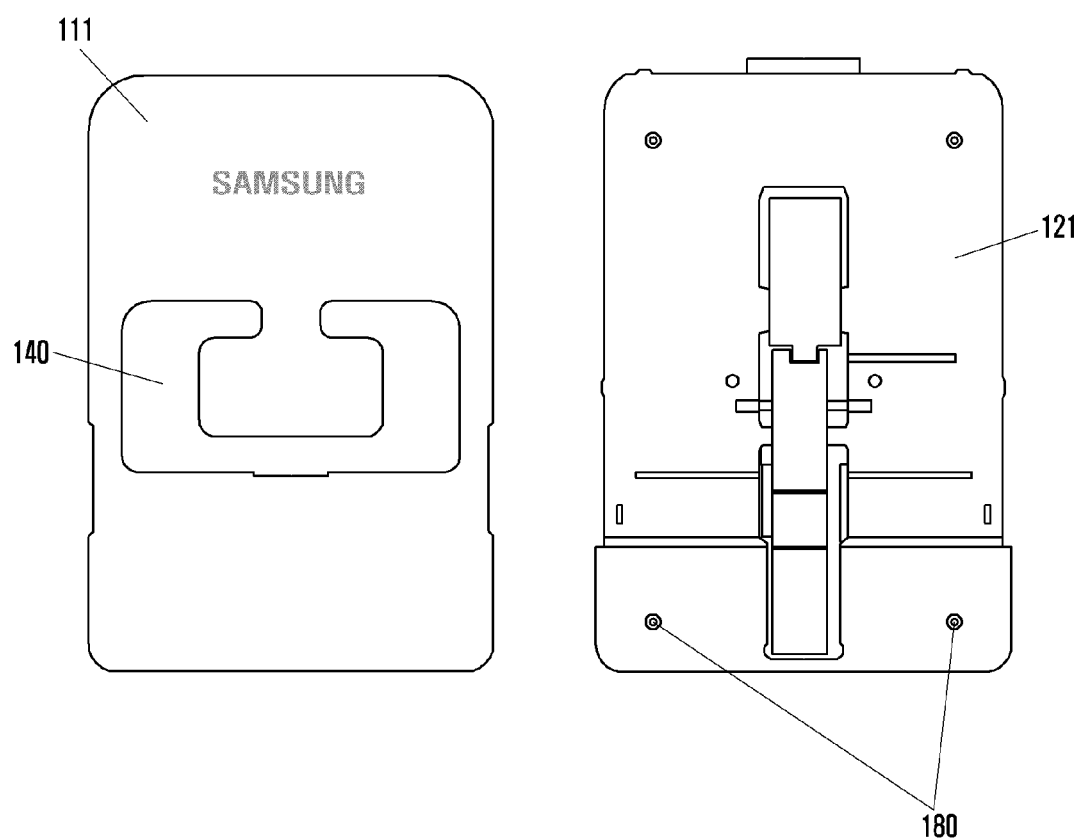

Referring to the assembly example of FIG. 9, after terminal cradling unit 140 and the first support 161 are coupled to the inner plate 120 and the second support 162 and the third support 163 are coupled to the inner plate 120, the inner plate 120 is coupled to front plate 110 and fastened using screws 180.

Figure 10:
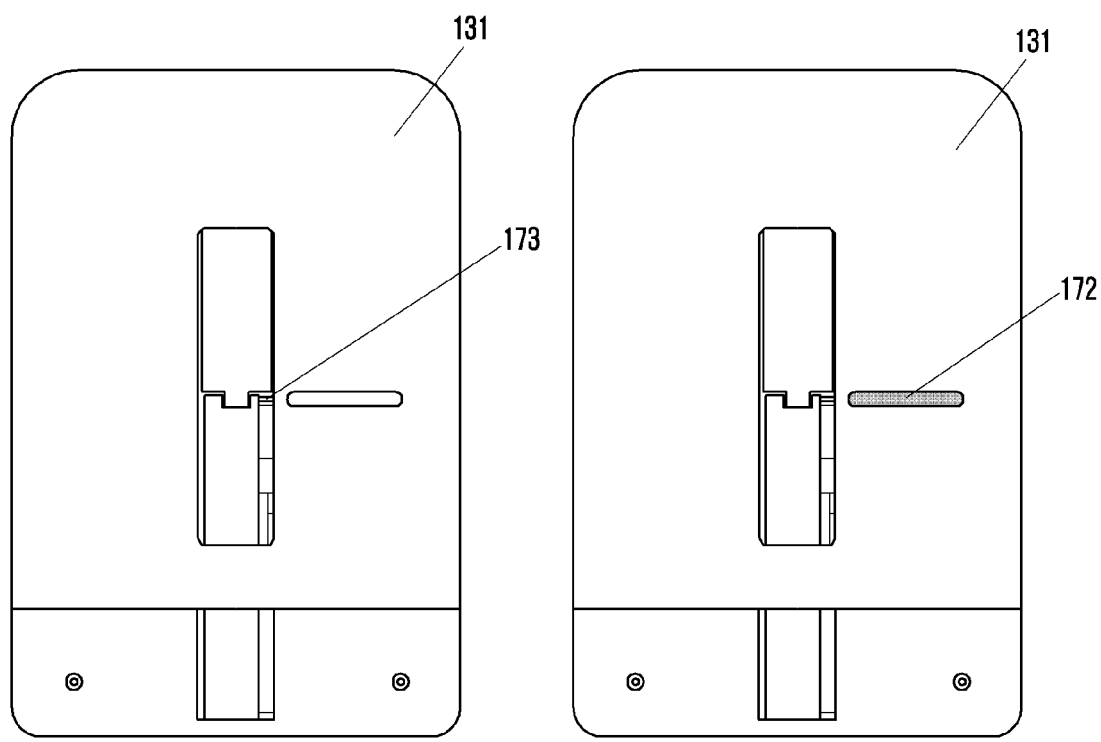

Referring now to the assembly example of FIG. 10, the inner surface 132 and outer surface 131 of the rear plate 130 may be coupled to each other, the support mechanism 160 and the rear plate 130 may be coupled in a hinged configuration using one first pin 173. Stopper 172 may be inserted so as to prevent the first pin 173 from being released.

Figure 11:
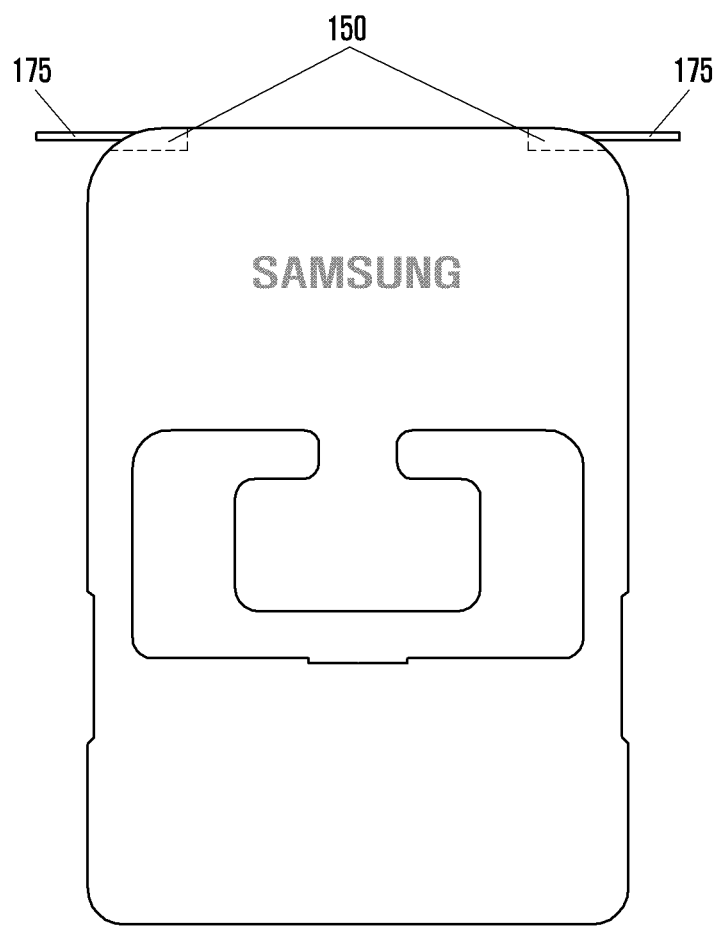

Referring now to the assembly example of FIG. 11, one second pin 175 is inserted into the hinge portion 150 between the rear plate 130 and front plate 110 so as to rotatably couple the rear plate 130 with front plate 110. A plurality of hinge portions 150 may be provided in the portion where the rear plate 130 and front plate 110 face each other.

Advantageously, the portable foldable cradled is closed herein allows an electronic device to be charged while the electronic device is cradled thereon. Furthermore, the portable foldable cradle disclosed herein does not affect the look or a user's operation of the electronic device. In turn, the reliability of the electronic device is improved. In addition, the portable foldable cradle may be configured such that the number of steps required to unfold and fold the portable foldable cradle is minimized, which allows the portable foldable cradle to be used more conveniently. In this regard, the portable foldable cradle may be configured such that its thickness when folded is minimized. Thus, the portable foldable cradle disclosed herein can be easily and conveniently carried.

The examples described above illustrate different aspects of the disclosure to help one of ordinary skill in the art to comprehend the foldable cradle disclosed herein. It is understood that the examples above are not intended to limit the scope of the present disclosure as defined by the appended claims. It is further understood that different modifications can be made to the examples described above without departing from the spirit and scope of the present disclosure.

What is claimed is:

1. A portable foldable cradle for an electronic device, comprising:
   a front plate;
   a rear plate rotatably coupled to and folded on the front plate; and
   a support mechanism between the front plate and the rear plate in which a first end of the support mechanism is hinged to a cradling unit, the cradling unit being configured to support the electronic device thereon, wherein the cradling unit can be opened or closed with respect to the front plate when the front plate and the rear plate are folded or unfolded, and
   wherein the support mechanism includes a first support, a second support, and a third support such that one end of the first support is rotatably coupled with the cradling unit and another end of the first support is coupled to the rear plate and the third support.

2. The portable foldable cradle of claim 1, wherein the cradling unit is formed in a "C" shape such that a central portion of the cradling unit comprises an opening.

3. The portable foldable cradle of claim 2, wherein the cradling unit protrudes through a part of the front plate.

4. The portable foldable cradle of claim 1, wherein the cradling unit to come in close contact with the front plate when the front plate and the rear plate are folded.

5. The portable foldable cradle of claim 1, wherein the cradling unit is exposed when the front plate and the rear plate are unfolded.

6. The portable foldable cradle of claim 1, wherein the cradling unit further includes an anti-slip portion to prevent the electronic device placed thereon from slipping from the cradling unit.

7. The portable foldable cradle of claim 6, wherein the anti-slip portion has a surface formed in an uneven configuration or made of an elastic material.

8. The portable foldable cradle of claim 1, wherein the front plate comprises a recess that corresponds to the cradling unit in size and shape such that the cradling unit is fitted into the recess to prevent the cradling unit from protruding, when the front plate and the rear plate are folded.

9. The portable foldable cradle of claim 1, wherein one end of the second support and one end of the third support are rotatably coupled to each other, another end of the second support being coupled to the front plate and another end of the third support being coupled to the rear plate.

10. The portable foldable cradle of claim 1, wherein, when the front plate and the rear plate are folded, an area where the second support and the third support are coupled to each other are folded while being moved up toward an axis where the front plate and the rear plate are coupled to each other.

11. The portable foldable cradle of claim 10, wherein, when the front plate and the rear plate are folded, the cradling unit comes in close contact with an outer surface of the front plate and the first support comes in close contact with an inner surface of the rear plate, while a portion where the cradling unit and the first support are coupled to each other is folded.

12. The portable foldable cradle of claim 10, wherein, when the front plate and the rear plate are unfolded, a portion where the second support and the third support are coupled to each other is unfolded, and the first support and the cradling unit are spaced apart from each other at a predetermined angle.

13. The portable foldable cradle of claim 1, wherein each of the front plate and the rear plate further includes an anti-slip portion to come in contact with a surface.

14. The portable foldable cradle of claim 1, wherein at least one of the front plate and the rear plate further includes a gripping recess on a lateral side.

* * * * *